July 25, 1933.    J. BORNSTEIN    1,919,411
WIPER MECHANISM FOR WINDSHIELDS AND THE LIKE
Filed Aug. 13, 1930    3 Sheets-Sheet 1

Inventor
Joseph Bornstein
by Arthur F. Randall
atty.

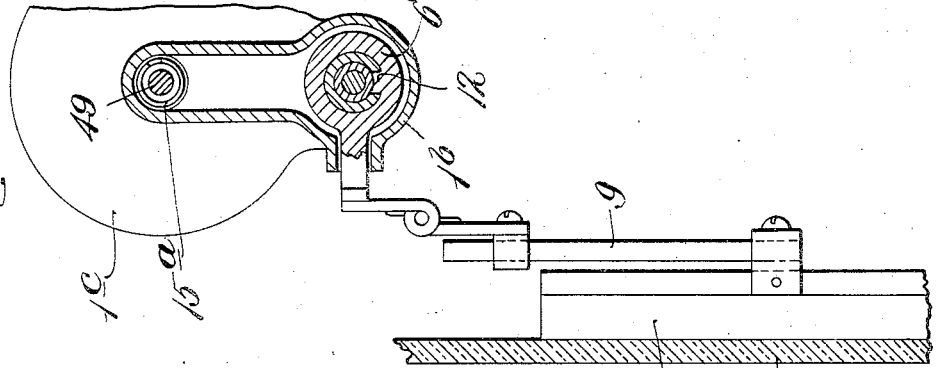
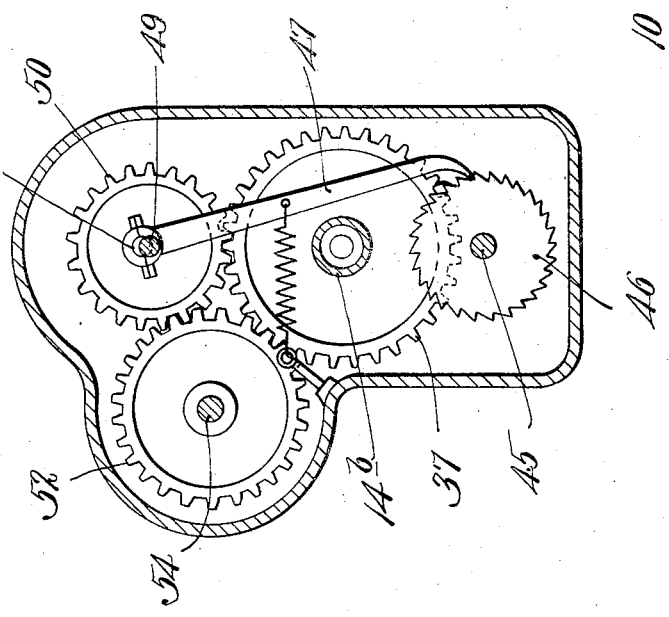
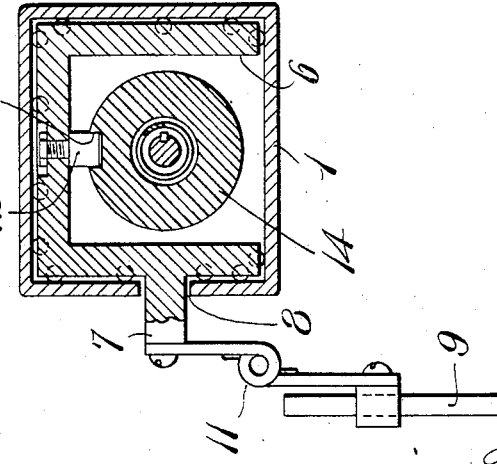

Patented July 25, 1933

1,919,411

UNITED STATES PATENT OFFICE

JOSEPH BORNSTEIN, OF BOSTON, MASSACHUSETTS, ASSIGNOR TO LOUIS BORNSTEIN, OF QUINCY, MASSACHUSETTS

WIPER MECHANISM FOR WINDSHIELDS AND THE LIKE

Application filed August 13, 1930. Serial No. 475,108.

My invention relates to wiper mechanisms for windshields and the like and it has for its object to provide an improved self-contained wiper mechanism of that class which is provided with a spring motor by which one or more wiper elements or members are reciprocated to clean the glass of the windshield or the like. It is also an object of my invention to provide a wiper mechanism of the class indicated whose spring motor can be quickly and conveniently wound up and which will be of simple, efficient and compact construction.

One feature of my invention resides in the construction and mode of operation of the spring motor by which the wiping mechanism is operated.

Another feature of my invention consists in providing a tubular wiper-operating shaft within which is arranged the spring of the motor whereof one end is connected with said shaft and the opposite end with manually operated means by which said spring is wound up to store motive power therein.

A third feature of my invention consists in connecting the spring of the motor with a wiper-operating worm shaft, or other member, by power transmitting mechanism which operates positively and automatically to drive said shaft or member alternately in opposite directions.

Other features of my invention are hereinafter pointed out.

In the accompanying drawings:

Figure 2 is a section on line 2—2 of Fig. 1.

Figure 4 is a section on line 4—4 of Fig. 3.

Figure 5 is a section on line 5—5 of Fig. 3.

Figure 1:
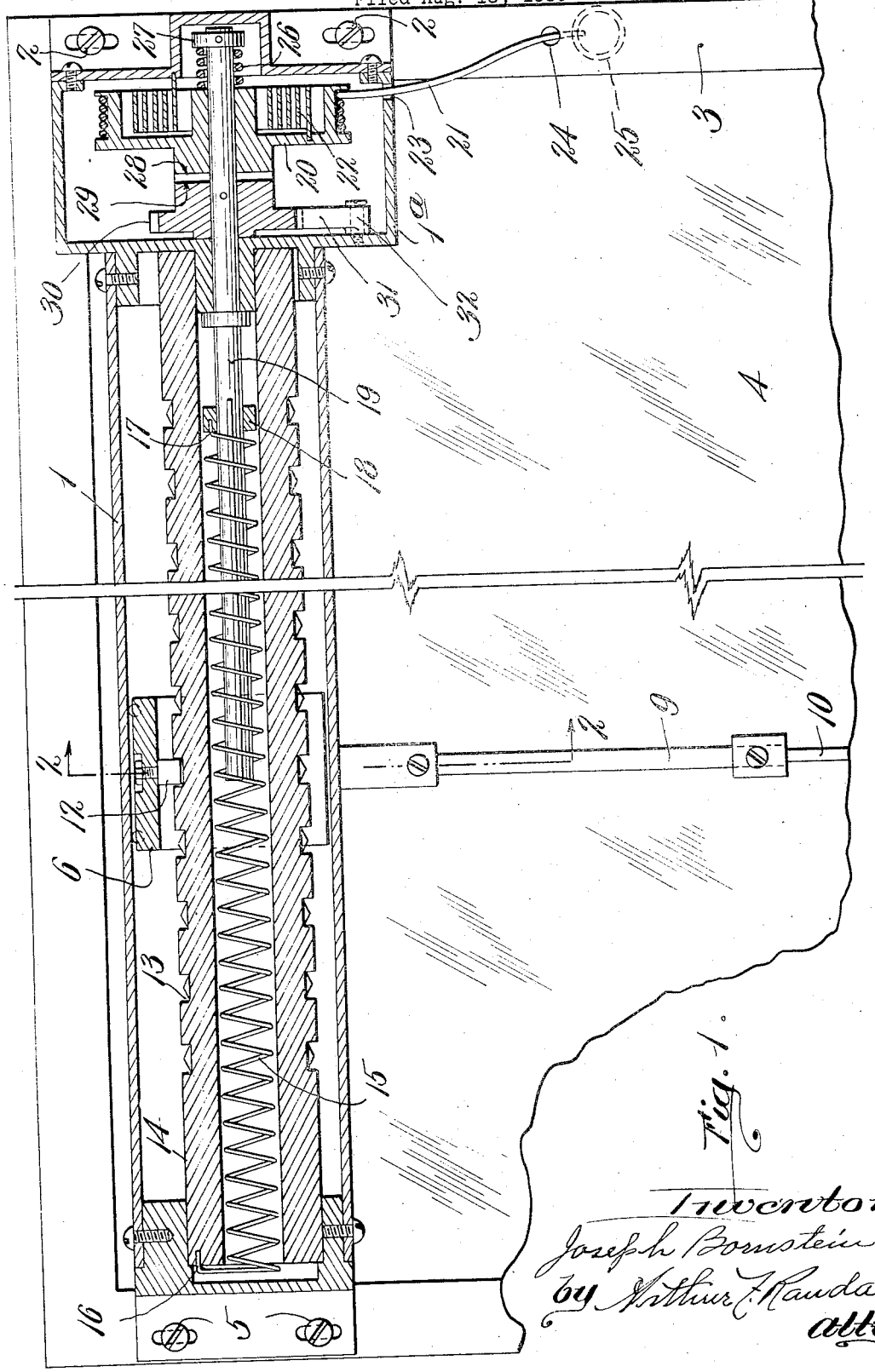
Figure 1 is a front elevation of the upper portion of the windshield of an automobile having a wiper mechanism attachment applied thereto embodying certain features of my invention, said mechanism being shown partly in elevation and partly in section.

The form of my invention illustrated in Figs. 1 and 2 includes a slotted tubular frame 1 provided at one end thereof with a housing enlargement 1a which is fastened by screws 2 to one of the side bars of the frame 3 of a glass windshield 4, while the opposite end of the tubular frame 1 is fastened by screws 5 to the other side bar of the frame 3.

Within the tubular frame 1 is movably mounted a wiper carriage 6 made with an extension 7, Fig. 2, projecting through the slot 8 of the housing 1 to the exterior of the latter where it has connected to it the upper end of the stem 9 of a wiper element 10. The connection between the stem 9 and the extension 7 includes a spring 11 by which the wiper element 10 is yieldingly held against the glass 4 of the windshield.

The carriage 6 is provided with a stud 12 occupying an endless groove 13 provided upon the exterior of a tubular worm shaft 14. This groove 13, as is commonly the case, is made so as to comprise right-hand and left-hand spiral portions which are connected at their opposite ends so that as the worm shaft 14 is continuously rotated in one direction, it acts through the stud 12 to reciprocate the carriage 6 longitudinally within the tubular frame 1 thereby moving the wiper element 10 back and forth across the windshield glass 4 on a rectilinear path.

Shaft 14 is journaled at its opposite ends in bearings provided on the frame and is also held against endwise movement thereon.

Within the tubular shaft 4 is arranged a spiral spring 15 whereof one end is connected at 16 with the shaft 14 and the opposite end at 17 with a collar 18 that is splined upon a spindle 19 journaled in a bearing provided on the frame of the mechanism. The spline connection between the collar 18 and spindle 19 prevents relative rotary movement thereof but permits the collar to be shifted longitudinally on the spindle when the spring is wound up and as it unwinds.

The spindle 19 extends into the housing section 1a of the frame and has loosely mounted thereon a sheave 20 to which is fastened one end of a pull-cable 21. Most of this pull-cable 21 is maintained wound upon the sheave 20 by a spring 22, one end of which is fastened to said sheave and the opposite end to the housing section 1a. The free end portion of cable 21 extends from sheave 20 through an aperture 23 provided through an aperture 24 provided through one of the side bars of the windshield frame 3 to the inner side of the latter where it is provided with a finger ring 25.

Mounted upon one end portion of the spindle 19 is a coiled spring 26 one end of which bears against a collar 27 fast on said spindle and the opposite end against one end of the hub of sheave 20. The opposite end of the hub of sheave 20 is constructed with a toothed clutch face 28 to cooperate with a toothed clutch face 29 provided at one end of the hub of a ratchet wheel 30. This ratchet wheel 30 is continuously engaged by a spring pressed detent 31 pivotally mounted at 32 upon the frame section 1a.

As will be clear the spring 26 yieldingly holds the two clutch faces 28 and 29 in engagement so that when the sheave 20 is rotated by draft upon the cable 21 it acts through the clutch faces 28 and 29 to rotate the ratchet wheel 30 and the spindle 19 to which the latter is fixed. As the sheave 20 is thus rotated by means of the cable 21 the spring 22 is wound up so that when the pull upon said cable is relaxed, said spring rotates the sheave 20 in the opposite direction relatively to the ratchet wheel 30 thereby rewinding the cable 21 on to the sheave 20 until the ring 25 engages the frame 3. The clutch faces 28 and 29 are made with beveled teeth so that when the sheave 20 is rotated by means of cable 21 power is transmitted from the sheave to the ratchet wheel 30, but when said sheave is roated by the spring 22 the teeth of its clutch face 28 drag idly over the teeth of clutch face 29 while the detent 31 holds the ratchet 30 at rest.

It will thus be clear that the spring 15 can be very quickly and conveniently wound up by the driver of the vehicle from his position on the driver's seat by means of the cable 21, the spline connection between collar 18 and spindle 19 permitting said collar to move toward the left as said spring is wound up and toward the right, Fig. 1, as the power stored within said spring is utilized.

A distinguishing feature of the above described mechanism is that the worm shaft is a tubular structure providing a chamber accommodating the spring by which said worm shaft is rotated thus affording great economy of space and it is also a distinguishing feature of this mechanism that the motor spring is manually wound up and operates through the mechanism described to reciprocate the wiper element 10 on a rectilinear path back and forth across the face of the windshield glass 4.

Figure 3:
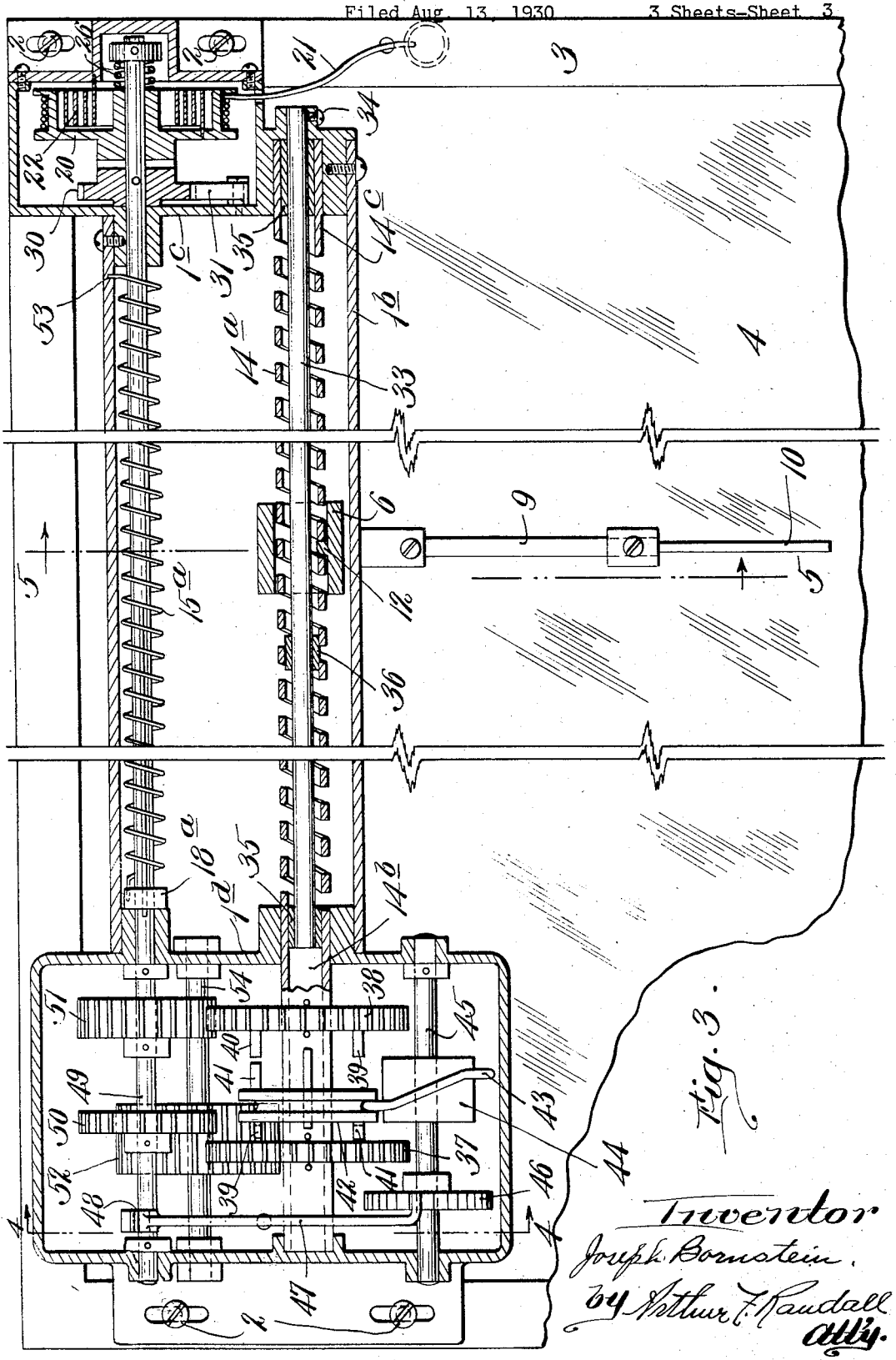
Figure 3 illustrates another form of my invention.

The embodiment of my invention illustrated in Figs. 3, 4 and 5, includes a tubular housing frame section 1b to the opposite ends of which are rigidly connected box-like housing sections 1c and 1d, each of the latter being fastened by screws 2 to the frame 3 of in the wall of the frame section 1a and thence the wind shield 4 upon the outer, or front, side of the latter. In this instance the worm shaft 14a consists of a spirally coiled strip connected at its opposite ends with cylindrical end portions 14b and 14c, the latter being journaled in bearings on the frame of the mechanism. Thus the worm shaft 14a provides a single right-hand spiral slot for the stud 12 of the wiper carriage 6.

Extending through the slotted portion of the worm shaft 14a is a rod 33 fastened at 34 to the frame of the mechanism and provided at intervals throughout its length with isolated bearing sleeves 35 and 36 which are fixed in position upon said rod 33. The intermediate bearing, or bearings, 36 serve to support the slotted portion of the worm shaft 14a against displacement sidewise.

Loosely mounted upon the cylindrical portion 14b of the worm shaft, within the housing section 1d, are two gears 37 and 38 whose inner faces are constructed to serve as clutch members, being provided with studs 39 and 40, respectively, to co-operate with studs 41 provided upon the opposite faces of a clutch member 42 splined upon the cylindrical portion 14b of the worm shaft.

The clutch member 42 is made upon its exterior with a circumferential groove that is occupied by the peripheral flange 43 of a cam member 44 fastened in position upon a shaft 45 journaled in bearings provided on the frame section 1d.

Shaft 45 also has fast on it a ratchet wheel 46 co-operating with the free end of a pawl 47 whose opposite end is made with a strap surrounding an eccentric 48, Figs. 3 and 4, provided upon a shaft 49. This shaft 49 is journaled in bearings on the frame of the mechanism and extends from end to end thereof.

Within the housing section 1d the shaft 49 has fixedly mounted thereon two gears 50 and 51, the former operating through an intermediate gear 52 to continuously drive the gear 37 in one direction and the latter operating directly to continuously drive the gear 38 in the opposite direction.

At its opposite end the shaft 49 extends into the housing section 1c of the frame and has loosely mounted thereon a sheave 20 provided with a cable 21 and spring 22. The sheave 20 is yieldingly held in clutching engagement with a ratchet wheel 30 fast on shaft 49 by means of a coiled spring 26 so that when operated by means of cable 21 the sheave acts to rotate ratchet wheel 30 and shaft 49 in one direction, movement of said parts in the opposite direction being prevented by a detent 31.

Surrounding the shaft 49 is a coiled spring 15a whereof one end is fastened to a collar 18a splined upon shaft 49 and the opposite end to the tubular frame sections 1b at 53.

The intermediate gear 52 is fast on a shaft 54 journaled at its opposite ends in bearings on the frame section 1d.

As will be clear the spring 15d is manually maintained wound up by means of the cable 21 and its power is transmitted through shaft 49, and gears 50, 51 and 52 to continuously rotate the gears 37 and 38 in opposite directions. At the same time the rotation of shaft 49 operates through eccentric 48 and pawl 49 to rotate the shaft 45 and cam 44 step by step.

The cam flange 43 is constructed so that during one half of each revolution of shaft 45 it maintains the clutch member 42 interlocked with the gear 37 and during the other half of each revolution of shaft 45 it maintains the clutch member 42 interlocked with the gear 38. Thus the gears 37 and 38 are alternately connected with the worm shaft 14a—14b—14c, and each of said gears is maintained connected with said worm shaft for a predetermined period of time during which the wiper carriage 6 is moved endwise of the worm shaft from the limit of its movement in one direction to the limit of its movement in the other direction, said worm shaft 14a—14b—14c being alternately rotated a predetermined number of revolutions first in one direction and then in the opposite direction to effect this reciprocation of the wiper carriage 6.

It will be clear that while one of the gears 37 or 38 is held clutched to the worm shaft by the clutch member 42 the other of said two gears is running idle.

What I claim is:

1. A wiper mechanism having, in combination, a housing-frame, a wiper carriage; a worm shaft within said housing-frame for reciprocating said carriage on a rectilinear path; a coiled spring within said housing-frame; means connecting one end of said spring with said worm shaft; a rotatably supported sheave within said housing-frame; means connecting the opposite end of said coiled spring with said sheave through which rotation of the latter in one direction only winds up said coiled spring; a manually operated pull-cable having one end thereof connected with said sheave and its opposite end portion outside of said housing-frame; a spring within said housing-frame for rotating said sheave in a direction to wind said cable thereon, and a detent device for holding the last mentioned end of said coiled spring against unwinding.

2. A wiper mechanism constructed in accordance with claim 1, wherein said worm-shaft is tubular and wherein said coiled spring is housed within said tubular worm shaft.

3. A wiper mechanism having, in combination, a housing-frame; a reciprocatory wiper element movably supported by said frame; a spring motor within said housing-frame; reversible power transmitting mechanism within said housing-frame including a worm shaft through which said spring motor acts to operate said wiper element, and automatic means within said housing-frame for periodically reversing said power transmitting mechanism thereby to cause the same to reciprocate said wiper element.

4. A wiper mechanism having, in combination, a housing-frame; a wiper element movably supported by said frame; a spring motor within said housing-frame; reversible power transmitting mechanism within said housing-frame including a worm shaft through which said spring motor acts to operate said wiper element, and automatic means within said housing-frame for periodically reversing said power transmitting mechanism thereby to cause the same to reciprocate said wiper element on a rectilinear path, said automatic reversing means including a rotatable cam co-operatively associated with said mechanism and means through which said cam is independently driven by said spring motor to control said mechanism.

5. A wiper mechanism for vehicles having, in combination, a housing-frame, a wiper element movably supported thereby, and a spring motor within said housing-frame for actuating said wiper element, said motor being connected with said wiper element and including a manually operated wind-up mechanism for the spring of said motor, said wind-up mechanism comprising a sheave, means through which rotation of said sheave in one direction only winds up said motor, a manually operated pull-cable having one end thereof connected with said sheave and its opposite end portion disposed outside of said housing-frame in a position where it is accessible to the driver of the vehicle, a spring for rotating said sheave in a direction to wind said cable thereon, and a detent device for maintaining said motor in its wound up condition.

JOSEPH BORNSTEIN.